US008641509B2

(12) United States Patent
Nicely et al.

(10) Patent No.: US 8,641,509 B2

(45) Date of Patent: *Feb. 4, 2014

(54) GAMING DEVICE PROVIDING AN AWARD BASED ON A COUNT OF OUTCOMES WHICH MEETS A CONDITION

(71) Applicant: IGT, Reno, NV (US)

(72) Inventors: Mark C. Nicely, Daly City, CA (US); Kathleen Bolich, Davis, CA (US)

(73) Assignee: IGT, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/800,949

(22) Filed: Mar. 13, 2013

(65) Prior Publication Data

US 2013/0196748 A1 Aug. 1, 2013

Related U.S. Application Data

(63) Continuation of application No. 13/178,216, filed on Jul. 7, 2011, now Pat. No. 8,414,379, which is a continuation of application No. 10/993,402, filed on Nov. 18, 2004, now Pat. No. 8,002,620.

(60) Provisional application No. 60/523,234, filed on Nov. 18, 2003.

(51) Int. Cl.
*G06F 17/00* (2006.01)

(52) U.S. Cl.
USPC .......................................................... 463/20

(58) Field of Classification Search
USPC ..................................................... 463/16–20
See application file for complete search history.

(56) References Cited

U.S. PATENT DOCUMENTS

| | | | |
|---|---|---|---|
| 1,527,929 | A | 2/1925 | Simons |
| 2,545,644 | A | 3/1951 | Benton et al. |
| 3,975,022 | A | 8/1976 | Figueroa |
| 4,051,939 | A | 10/1977 | Murphy et al. |
| 4,182,515 | A | 1/1980 | Nemeth |
| 4,410,178 | A | 10/1983 | Partridge |
| 4,448,419 | A | 5/1984 | Telnaes |
| 4,508,353 | A | 4/1985 | Meyer et al. |
| 4,624,459 | A | 11/1986 | Kaufman |

(Continued)

FOREIGN PATENT DOCUMENTS

| | | |
|---|---|---|
| DE | 476586 | 3/1930 |
| DE | 3 242 890 | 5/1984 |

(Continued)

OTHER PUBLICATIONS

4DU Dice Unit Advertisement written by starpoint.uk.com, printed on Sep. 3, 2002.

(Continued)

*Primary Examiner* — Michael Cuff

(74) *Attorney, Agent, or Firm* — Neal, Gerber & Eisenberg LLP

(57) ABSTRACT

Methods and apparatus for providing an award based on a multiplicity of game outcomes. In one implementation the invention provides a method for providing a game. The method includes placing a bet by a player, playing of a game to produce a game outcome, evaluating a primary game outcome, paying a direct award if the primary outcome merits it, advancing a bonus accumulator if the primary outcome merits it, and if the bonus accumulator has advanced sufficiently, paying a bonus award to the player and clearing the bonus accumulator.

16 Claims, 13 Drawing Sheets

(56) References Cited

U.S. PATENT DOCUMENTS

| | | | |
|---|---|---|---|
| 4,695,053 | A | 9/1987 | Vazquez, Jr. et al. |
| 4,732,386 | A | 3/1988 | Rayfiel |
| 4,775,155 | A | 10/1988 | Lees |
| 4,861,041 | A | 8/1989 | Jones et al. |
| 4,964,638 | A | 10/1990 | Ishida |
| 4,991,848 | A | 2/1991 | Greenwood et al. |
| 5,046,737 | A | 9/1991 | Fienberg |
| 5,058,893 | A | 10/1991 | Dickinson et al. |
| 5,072,946 | A | 12/1991 | Miller |
| 5,116,055 | A | 5/1992 | Tracy |
| 5,152,529 | A | 10/1992 | Okada |
| 5,205,555 | A | 4/1993 | Hamano |
| 5,324,041 | A | 6/1994 | Boylan et al. |
| 5,342,047 | A | 8/1994 | Heidel et al. |
| 5,364,100 | A | 11/1994 | Ludlow et al. |
| 5,380,007 | A | 1/1995 | Travis et al. |
| 5,395,111 | A | 3/1995 | Inoue |
| 5,411,271 | A | 5/1995 | Mirando |
| 5,423,539 | A | 6/1995 | Nagao |
| 5,449,173 | A | 9/1995 | Thomas et al. |
| 5,456,465 | A | 10/1995 | Durham |
| 5,501,455 | A | 3/1996 | Hirata et al. |
| 5,511,781 | A | 4/1996 | Wood et al. |
| 5,515,486 | A | 5/1996 | Amro et al. |
| 5,531,441 | A | 7/1996 | Dabrowski et al. |
| 5,536,016 | A | 7/1996 | Thompson |
| 5,542,669 | A | 8/1996 | Charron et al. |
| 5,560,603 | A | 10/1996 | Seelig et al. |
| 5,570,885 | A | 11/1996 | Ornstein |
| 5,584,763 | A | 12/1996 | Kelly et al. |
| 5,607,162 | A | 3/1997 | Boylan et al. |
| 5,611,535 | A | 3/1997 | Tiberio |
| 5,664,998 | A | 9/1997 | Seelig et al. |
| 5,707,285 | A | 1/1998 | Place et al. |
| 5,711,525 | A | 1/1998 | Breeding |
| 5,722,891 | A | 3/1998 | Inoue |
| 5,769,716 | A | 6/1998 | Saffari et al. |
| 5,772,509 | A | 6/1998 | Weiss |
| 5,788,573 | A | 8/1998 | Baerlocher et al. |
| 5,788,574 | A | 8/1998 | Ornstein et al. |
| 5,823,872 | A | 10/1998 | Prather et al. |
| 5,823,874 | A | 10/1998 | Adams |
| D400,597 | S | 11/1998 | Hedrick et al. |
| 5,833,538 | A | 11/1998 | Weiss |
| D402,702 | S | 12/1998 | Seelig et al. |
| 5,848,932 | A | 12/1998 | Adams |
| 5,851,147 | A | 12/1998 | Stupak et al. |
| 5,851,148 | A | 12/1998 | Brune et al. |
| 5,855,514 | A | 1/1999 | Kamille |
| 5,873,781 | A | 2/1999 | Keane |
| D406,865 | S | 3/1999 | Heidel |
| 5,882,261 | A | 3/1999 | Adams |
| 5,902,184 | A | 5/1999 | Bennett |
| 5,911,418 | A | 6/1999 | Adams |
| 5,919,091 | A | 7/1999 | Bell et al. |
| 5,927,714 | A | 7/1999 | Kaplan |
| 5,935,002 | A | 8/1999 | Falciglia |
| 5,944,314 | A | 8/1999 | Stavinsky |
| 5,947,820 | A | 9/1999 | Morro et al. |
| 5,947,821 | A | 9/1999 | Stone |
| 5,951,397 | A | 9/1999 | Dickinson |
| 5,976,015 | A | 11/1999 | Seelig et al. |
| 5,980,384 | A | 11/1999 | Barrie |
| 5,984,781 | A | 11/1999 | Sunaga |
| 5,988,643 | A | 11/1999 | Awada |
| 5,989,121 | A | 11/1999 | Sakamoto |
| 5,996,997 | A | 12/1999 | Kamille |
| 5,997,400 | A | 12/1999 | Seelig et al. |
| 5,997,401 | A | 12/1999 | Crawford |
| 6,004,207 | A | 12/1999 | Wilson, Jr. et al. |
| 6,015,346 | A | 1/2000 | Bennett |
| 6,019,369 | A | 2/2000 | Nakagawa et al. |
| 6,024,642 | A | 2/2000 | Stupak |
| 6,033,306 | A | 3/2000 | De Souza |
| 6,033,307 | A | 3/2000 | Vancura |
| 6,039,649 | A | 3/2000 | Schulze |
| 6,053,813 | A | 4/2000 | Mathis |
| 6,056,642 | A | 5/2000 | Bennett |
| 6,059,289 | A | 5/2000 | Vancura |
| 6,059,658 | A | 5/2000 | Mangano et al. |
| 6,086,066 | A | 7/2000 | Takeuchi et al. |
| 6,089,976 | A | 7/2000 | Schneider et al. |
| 6,089,977 | A | 7/2000 | Bennett |
| 6,089,978 | A | 7/2000 | Adams et al. |
| 6,102,400 | A | 8/2000 | Scott et al. |
| 6,102,402 | A | 8/2000 | Scott et al. |
| 6,102,798 | A | 8/2000 | Bennett |
| 6,105,962 | A | 8/2000 | Malavazos et al. |
| 6,113,098 | A | 9/2000 | Adams |
| 6,126,542 | A | 10/2000 | Fier |
| 6,129,355 | A | 10/2000 | Hahn et al. |
| 6,135,884 | A | 10/2000 | Hedrick et al. |
| 6,142,873 | A | 11/2000 | Weiss et al. |
| 6,142,874 | A | 11/2000 | Kodachi et al. |
| 6,149,521 | A | 11/2000 | Sanduski |
| 6,155,925 | A | 12/2000 | Giobbi et al. |
| 6,159,097 | A | 12/2000 | Gura |
| 6,159,098 | A | 12/2000 | Slomiany et al. |
| 6,162,121 | A | 12/2000 | Morro et al. |
| 6,164,652 | A | 12/2000 | Lauretta et al. |
| 6,168,520 | B1 | 1/2001 | Baerlocher et al. |
| 6,168,523 | B1 | 1/2001 | Piechowiak et al. |
| 6,173,955 | B1 | 1/2001 | Perrie et al. |
| 6,174,234 | B1 | 1/2001 | Seibert, Jr. et al. |
| 6,174,235 | B1 | 1/2001 | Walker et al. |
| 6,190,254 | B1 | 2/2001 | Bennett |
| 6,190,255 | B1 | 2/2001 | Thomas et al. |
| 6,203,429 | B1 | 3/2001 | Demar et al. |
| 6,203,430 | B1 | 3/2001 | Walker et al. |
| D441,031 | S | 4/2001 | Seelig et al. |
| 6,213,876 | B1 | 4/2001 | Moore, Jr. |
| 6,220,593 | B1 | 4/2001 | Pierce et al. |
| 6,224,483 | B1 | 5/2001 | Mayeroff |
| 6,227,969 | B1 | 5/2001 | Yoseloff |
| 6,227,970 | B1 | 5/2001 | Shimizu et al. |
| 6,227,971 | B1 | 5/2001 | Weiss |
| 6,231,442 | B1 | 5/2001 | Mayeroff |
| 6,234,897 | B1 | 5/2001 | Frohm et al. |
| D443,313 | S | 6/2001 | Brettschneider |
| 6,251,013 | B1 | 6/2001 | Bennett |
| 6,254,481 | B1 | 7/2001 | Jaffe |
| 6,261,177 | B1 | 7/2001 | Bennett |
| 6,267,669 | B1 | 7/2001 | Luciano, Jr. et al. |
| 6,270,411 | B1 | 8/2001 | Gura et al. |
| 6,279,910 | B1 | 8/2001 | de Keller |
| 6,287,197 | B1 | 9/2001 | Dickinson et al. |
| 6,299,165 | B1 | 10/2001 | Nagano |
| 6,302,790 | B1 | 10/2001 | Brossard |
| 6,305,686 | B1 | 10/2001 | Perrie et al. |
| 6,309,300 | B1 | 10/2001 | Glavich |
| 6,312,334 | B1 | 11/2001 | Yoseloff |
| 6,315,660 | B1 | 11/2001 | DeMar et al. |
| 6,315,663 | B1 | 11/2001 | Sakamoto |
| 6,315,664 | B1 | 11/2001 | Baerlocher et al. |
| 6,322,309 | B1 | 11/2001 | Thomas et al. |
| 6,336,860 | B1 | 1/2002 | Webb |
| 6,336,863 | B1 | 1/2002 | Baerlocher et al. |
| 6,340,158 | B2 | 1/2002 | Pierce et al. |
| 6,346,043 | B1 | 2/2002 | Colin et al. |
| 6,347,996 | B1 | 2/2002 | Gilmore et al. |
| 6,364,767 | B1 | 4/2002 | Brossart et al. |
| 6,368,216 | B1 | 4/2002 | Hedrick et al. |
| 6,368,218 | B2 | 4/2002 | Angell, Jr. |
| 6,386,974 | B1 | 5/2002 | Adams |
| 6,398,220 | B1 | 6/2002 | Inoue |
| 6,398,644 | B1 | 6/2002 | Perrie et al. |
| 6,398,645 | B1 | 6/2002 | Yoseloff |
| 6,409,172 | B1 | 6/2002 | Vancura |
| 6,419,579 | B1 | 7/2002 | Bennett et al. |
| 6,435,500 | B2 | 8/2002 | Gumina |
| 6,439,995 | B1 | 8/2002 | Hughs-Baird et al. |
| 6,443,837 | B1 | 9/2002 | Jaffe et al. |
| 6,461,241 | B1 | 10/2002 | Webb et al. |
| D465,531 | S | 11/2002 | Luciano, Jr. et al. |

(56) References Cited

U.S. PATENT DOCUMENTS

| | | | |
|---|---|---|---|
| 6,474,649 | B1 | 11/2002 | Kennedy et al. |
| 6,481,713 | B2 | 11/2002 | Perrie et al. |
| 6,494,785 | B1 | 12/2002 | Gerrard et al. |
| 6,511,375 | B1 | 1/2003 | Kaminkow |
| 6,533,660 | B2 | 3/2003 | Seelig et al. |
| 6,537,152 | B2 | 3/2003 | Seelig et al. |
| 6,561,902 | B1 | 5/2003 | Walker et al. |
| 6,569,015 | B1 | 5/2003 | Baerlocher et al. |
| 6,572,471 | B1 | 6/2003 | Bennett |
| 6,582,307 | B2 | 6/2003 | Webb |
| 6,592,457 | B1 | 7/2003 | Frohm et al. |
| 6,595,854 | B2 | 7/2003 | Hughs-Baird et al. |
| 6,602,136 | B1 | 8/2003 | Baerlocher et al. |
| 6,609,972 | B2 | 8/2003 | Seelig et al. |
| 6,645,074 | B2 | 11/2003 | Thomas et al. |
| 6,648,757 | B1 | 11/2003 | Slomiany et al. |
| 6,669,559 | B1 | 12/2003 | Baerlocher et al. |
| 6,676,516 | B2 | 1/2004 | Baerlocher et al. |
| 6,712,694 | B1 | 3/2004 | Nordman |
| 6,729,620 | B2 | 5/2004 | Jones |
| 6,749,502 | B2 | 6/2004 | Baerlocher |
| 6,783,457 | B2 | 8/2004 | Hughs-Baird et al. |
| 6,786,820 | B2 | 9/2004 | Gerrard et al. |
| 6,796,900 | B2 | 9/2004 | Baerlocher et al. |
| 6,802,773 | B2 | 10/2004 | Moody |
| 6,808,454 | B2 | 10/2004 | Gerrard et al. |
| 6,857,958 | B2 | 2/2005 | Osawa |
| 6,863,606 | B1 | 3/2005 | Berg et al. |
| 6,878,061 | B2 | 4/2005 | Baerlocher et al. |
| 6,908,383 | B2 | 6/2005 | Baerlocher et al. |
| 7,033,270 | B2 | 4/2006 | Baerlocher et al. |
| 7,121,943 | B2 | 10/2006 | Webb et al. |
| 7,326,110 | B2 | 2/2008 | Webb et al. |
| 7,335,102 | B2 | 2/2008 | Baerlocher et al. |
| 2002/0010018 | A1 | 1/2002 | Lemay et al. |
| 2002/0025847 | A1 | 2/2002 | Thomas et al. |
| 2002/0034974 | A1 | 3/2002 | Wood et al. |
| 2002/0095836 | A1 | 7/2002 | Segan et al. |
| 2002/0137559 | A1 | 9/2002 | Baerlocher |
| 2002/0155881 | A1 | 10/2002 | Yoshida |
| 2002/0187825 | A1 | 12/2002 | Tracy et al. |
| 2003/0027625 | A1 | 2/2003 | Rowe |
| 2003/0027626 | A1 | 2/2003 | Marks et al. |
| 2003/0228899 | A1 | 12/2003 | Evans |
| 2003/0236115 | A1 | 12/2003 | Chamberlain |
| 2004/0014515 | A1 | 1/2004 | Tracy et al. |
| 2004/0087357 | A1 | 5/2004 | Johnson |
| 2004/0087359 | A1 | 5/2004 | Cuddy et al. |
| 2004/0097282 | A1 | 5/2004 | Baerlocher et al. |
| 2004/0116179 | A1 | 6/2004 | Nicely et al. |
| 2004/0152511 | A1 | 8/2004 | Nicely et al. |
| 2004/0248647 | A1 | 12/2004 | Rothschild et al. |
| 2004/0248648 | A1 | 12/2004 | Rothschild et al. |
| 2005/0003880 | A1 | 1/2005 | Englman et al. |
| 2005/0020338 | A1 | 1/2005 | Stein |
| 2005/0051958 | A1 | 3/2005 | Snow |
| 2005/0059472 | A1 | 3/2005 | Joshi et al. |
| 2005/0153769 | A1 | 7/2005 | Casey et al. |
| 2005/0233796 | A1 | 10/2005 | Baerlocher et al. |
| 2007/0060272 | A1 | 3/2007 | Webb et al. |
| 2007/0135193 | A1 | 6/2007 | Nicely |

FOREIGN PATENT DOCUMENTS

| | | | |
|---|---|---|---|
| EP | 0 688 008 | | 12/1995 |
| EP | 0 840 264 | | 6/1998 |
| EP | 0 874 337 | | 10/1998 |
| EP | 0 886 250 | | 12/1998 |
| EP | 0 921 503 | | 6/1999 |
| EP | 0 945 837 | | 9/1999 |
| EP | 0 984 408 | | 3/2000 |
| EP | 0 984 409 | | 3/2000 |
| FR | 811 060 | | 4/1937 |
| GB | 912685 | | 12/1962 |
| GB | 1 202 691 | | 3/1967 |
| GB | 1 262 134 | | 2/1972 |
| GB | 2 090 690 | | 7/1982 |
| GB | 2 117 155 | | 10/1983 |
| GB | 2 170 636 | | 8/1986 |
| GB | 2 183 882 | | 6/1987 |
| GB | 2 262 642 | | 6/1993 |
| GB | 2 268 415 | | 12/1994 |
| GB | 2 295 043 | | 5/1996 |
| GB | 2 335 524 | | 9/1999 |
| GB | 2 353 128 | | 2/2001 |
| GB | 2 393 021 | | 3/2004 |
| GB | 2 396 566 | | 6/2004 |
| JP | 10-179923 | | 7/1998 |
| JP | 2002-085811 | | 3/2002 |
| JP | 2002-336415 | | 11/2002 |
| JP | 06-277332 | | 10/2006 |
| RU | 17678 | U1 | 4/2001 |
| WO | WO 93/03464 | | 2/1993 |
| WO | WO 97/27570 | | 7/1997 |
| WO | WO 9732285 | | 9/1997 |
| WO | WO 00/12186 | | 3/2000 |
| WO | WO 01/34261 | | 5/2001 |
| WO | WO 03/083795 | | 10/2003 |
| WO | WO 2005/028045 | | 3/2005 |

OTHER PUBLICATIONS

Addams Family Brochure and Article written by IGT, published in 2000.

Adders and Ladders Brochure written by Barcrest Ltd., available Jul. 2001.

All Grown Up written by Sodak Gaming, Inc., published in 2003, on or before December thereof.

American Bandstand Brochure written by Anchor Games, published in 2001.

Austin Powers written by IGT, published in 2001, on or before December thereof.

Beer Game: High-Low, [online] [retrieved on May 3, 2001]. Retrieved from <URL: Real Beer Page: Beer Game: High-Low>.

Big Shot!™ Advertisement published by Aristocrat Technologies, Inc., published in 2002.

Big Top Keno Advertisement published by Aristocrat Technologies, Inc., published in 2000.

Bonus Roulette Brochure written by R. Franco, published prior to Feb. 11, 2005.

Buck's Roulette Brochure, written by R. Franco, published prior to Feb. 11, 2005.

Caribbean Gold Brochure published by Aristocrat Technologies, Inc., published in 1998.

Catch a Wave Article written by IGT, published in 2001, on or before December thereof.

Chariot's Fortune Brochure, written by R. Franco, published prior to Feb. 11, 2005.

Classic Pot of Gold Brochure, written by Ace Coin Equipment Ltd., published prior to Feb. 11, 2005.

Clue Advertisement published by Mikohn in 2002, on or before December thererof.

Clue—Most Wanted Advertisement published by Mikohn in 2003, on or before December thereof.

Copyright Atronic Casino Technology, 1995 "Volcano Island" and "Hot Cash".

Cyberdyne Gaming Brochure written by Cyberdyne Gaming, published prior to Sep. 11, 2003.

Double Up Poker Game Description written by IGT published prior to 2001 in or before December thereof.

Easy Street Brochures and Articles written by Casino Data Systems, published in 2000.

Elvira® Mistress of the Dark™ Advertisement written by IGT, published in 2002.

Elvis Brochure and Article written by IGT, published in 1999.

Elvis Hits Advertisement written by IGT, published in 1999.

English-language translation of Official Action in regard to Russian counterpart (12 pages) available Nov. 2, 2005.

(56) References Cited

OTHER PUBLICATIONS

Fox 'N' Hound Brochure and Website Page written by IGT, 2000, printed on Mar. 21, 2001.
High Low Card Game written by Qeocities.com (website) printed May 3, 2001.
High Low Card Game, Geocities.com, printed May 3, 2001.
Holy Smoke Brochure, written by Impulse Gaming Ltd., published prior Feb. 11, 2005.
Hyper Viper Advertisement written by Barcrest Ltd., published in 1983.
In Between Game Description written by IGT, available prior to Sep. 2000.
Jack and the Beanstalk™ Brochure written by AC Coin & Slot, available prior to Sep. 22, 2006.
Jackpot Party Brochures and Articles written by WMS Gaming Inc. published in 1998 and 2001.
Jackpot Party Brochures and Articles, WMS Gaming Inc., 1998.
Jackpot Party, taken from www/wmsgaming.com, printed on Feb. 7, 2001.
King of the Grill™ Brochure, written by AC Coin & Slot, published prior to Feb. 11, 2005.
Line-Up Brochure, written by AC Coin & Slot, published prior to Feb. 11, 2005.
Little Green Men Jr.™ Advertisement, written by AC Coin & Slot, published prior to Jan. 2003.
Little Green Men Jr.™ Article written by Strictly Slots, published in Feb. 2003.
Miss America Brochure written by AC Coin & Slot, available prior to Sep. 22, 2006.
Mix and Match Advertisement published by AC Coin & Slot, available prior to Sep. 22, 2006.
Mix and Match Article written by Strictly Slots, published in Apr. 2002.
Money Grab Article written by Strictly Slots, published in Apr. 2001.
Money Grab™, written by WMS Gaming [online] [retrieved on Jan. 30, 2003]. Retrieved from <URL: http://www.wmsgaming.com/products/video/mg/index.html>.
Monopoly Brochures and Articles written by WMS Gaming, Inc., published in 1998, 1999 and 2000.
Monster Match Article written by Strictly Slots, published in Jan. 2002.
On the Money! Article written by Strictly Slots, published in Dec. 2000.
Payout!™ Advertisement written by www.csds.com/Gaming/Products/g Payout.htm, printed on Jan. 15, 2001.
Payout!™ Article written by Casino Data Systems, available prior to Sep. 22, 2006.
PCT International Search Report issued in PCT/US02/11156, Dec. 4, 2002.
Pick a Prize Brochure written by Acres Gaming Incorporated, published prior to 2001 in or before December thereof.
Pink Panther Brochure and Article written by IGT, published in 2000.
Power Slotto Brochure published by AC Coin & Slot prior to 2002 in or before December thereof.
Press Your Luck Brochure published by AC Coin & Slot prior to 2002 in or before December thereof.
Price is Right Showcase Showdown, written by IGT, published in 2001, on or before December thereof.
Quick Pick Paytime Brochure written by Acres Gaming Incorporated, published prior to 2001 in or before December thereof.
R&B™ Brochure published by AC Coin & Slot, available prior to Sep. 22, 2006.
Red, White and Blue Advertisement written by IGT, published in 2000, on or before December thereof.
Reel Dice Advertisement written by Gerber & Glass, published in 1936 in or before December thereof.
Road Hog Game Brochure (and Description) written by Barcrest Ltd., published 1992.
Royal Roulette Brochure written by Impulse Gaming Ltd., available prior to Sep. 22, 2006.
Rules of Card Games: One Minute Solitaire, published at www.pagat.com (website last updated Jan. 12, 2002), dated 1989 on or before December thereof.
Run for Your Money Game Brochure (and Description) written by Barcrest Ltd., published in 1998 and 1999.
Silver City Roundup Brochure published by AC Coin & Slot, available prior to Sep. 22, 2006.
Slot Machine Buyer's Handbook, A Consumer's Guide to Slot Machines written by David L. Saul and Daniel R. Mead, published in 1998 in or before December thereof.
Slot Machines A Pictorial History of the First 100 Years, 5th edition (in part), written by Marshall Fey, published in 1983, 1989, 1991, 1994 and 1997 in or before December thereof.
Slot Machines on Parade, 1st edition written by Robert N. Geddes and illustrated by Daniel R. Mead, published in 1980 in or before December thereof.
Slot Machines written by Marshall Fey, published in 1983, 1989, 1991, 1994 and 1997, on or before December thereof.
Slotopoly Brochure and Article written by IGT., published in 1998.
Slots 2003, part one, written by Melissa Raimondi, published Jan. 2003.
South Park written by IGT, published in 2000, on or before December thereof.
Spiker the Biker Brochure written by Barcrest Ltd., available Jul. 2001.
Spin-A-Lot Brochure written by Acres Gaming Incorporated, published prior to 2001 in or before December thereof.
Take Your Pick Article written by Strictly Slots, published in Mar. 2001.
Top Dollar Brochure written by IGT, published in 1998.
Trivial Pursuit Advertisement published by Mikohn in 2003, on or before December thereof.
Uno and Magic 8 Ball Slots Offer a One-Two Punch of Fun!, Slotline 2003, summer edition, 2003, on or before December thereof.
Uno Game Description by C.R. Light & Co., published in 1900, on or before December thereof.
Uno Game Illustration, written by Marshall Fey, published in 1983, 1989, 1991, 1994 and 1997, in or before December thereof.
Uno Original Instructions, Mattel, Inc., 1998, in or before December thereof.
Unusual Suspects—Clue Advertisement published by Mikohn in 2003, on or before December thereof.
Welcome to Video Reality Brochure, written by Atronic Casino Technology Ltd., published in 1995 in or before December thereof.
Yahtzee Bonus Advertisement written by Mikohn, published in 1999 in or before December thereof.
Letter from Marvin A. Motsenbocker of Mots Law dated Jan. 3, 2012, regarding Third Party Submission in Publication Application Under C.F.R. 1.99 filed for U.S. Appl. No. 13/178,246 (1 page).
Third Party Submission in Published Application Under 37 C.F.R. 1.99 filed for U.S. Appl. No. 13/178,246, dated Jan. 3, 2012 (3 pages).
US Patent No. 4,964,638 submitted with Third Party Submission in Published Application Under 37 C.F.R. 1.99 for U.S. Appl. No. 13/178,246 (2 pages).
JP06-277332A and English translation of paragraphs [0037] to [0039] of same submitted with Third Party Submission in Published Application Under 37 C.F.R. 1.99 for U.S. Appl. No. 13/178,246 (6 pages).
JP10-179923A and English translation of paragraphs [0087] to [0089] of same submitted with Third Party Submission in Published Application Under 37 C.F.R. 1.99 for U.S. Appl. No. 13/178,246 (5 pages).
JP2002-336415A and English translation of paragraph [0008] of same submitted with Third Party Submission in Published Application Under 37 C.F.R. 1.99 for U.S. Appl. No. 13/178,246 (4 pages).
JP2002-085811A and English translation of paragraph [0008] of same submitted with Third Party Submission in Published Application Under 37 C.F.R. 1.99 for U.S. Appl. No. 13/178,246 (3 pages).

FIG. 2
WIN UP TO
500,000
Banana-Rama
Match Three
skybet
vegas
£20
SIGNUP
BONUS
100
50
25
12
6
Balance:
3000.00
REAL PLAY
OPEN ACCOUNT
PAY TABLE
GAME RULES
RESPONSIBLE GAMING
EXIT GAME
LAST BET
CLICK PLAY TO START THE GAME
AUTO
PLAY

FIG. 6
500,000
Banana-Rama
Match Three
skybet
vegas
£20
SIGNUP
BONUS
Balance:
REAL PLAY
OPEN ACCOUNT
PAY TABLE
GAME RULES
RESPONSIBLE
GAMING
EXIT GAME
PLAY AGAIN
AUTO
PLAY

FIG. 8
MATCH 3
TO WIN UP TO
500,000
Banana-Rama
Match Three
MYSTERY-RAMA!!!
skybet
vegas
FREE £20
CLICK
HERE
Balance:
2963.00
REAL PLAY
OPEN ACCOUNT
PAY TABLE
GAME RULES
RESPONSIBLE
GAMING
EXIT GAME
TAKE
WIN?
PAID
LAST BET 1
CLICK 'TAKE WIN' TO COLLECT 6
AUTO
PLAY

GAMING DEVICE PROVIDING AN AWARD BASED ON A COUNT OF OUTCOMES WHICH MEETS A CONDITION

PRIORITY CLAIM

This application is a continuation application of, claims priority to and the benefit of U.S. patent application Ser. No. 13/178,216, filed on Jul. 7, 2011, which is a continuation application of, claims priority to and the benefit of U.S. patent application Ser. No. 10/993,402, filed on Nov. 18, 2004, now U.S. Pat. No. 8,002,620, which claims priority to and the benefit of U.S. Provisional Patent Application Ser. No. 60/523,234, filed on Nov. 18, 2003, the entire contents of which are each incorporated by reference herein.

BACKGROUND

The present invention relates to casino gaming.

There are various casino games, including slot games and card games.

In general, a game consists of the placing of one or more wagers (if more than one wager from a player are permitted by rules of the game), having the game play out according to rules of the game, and determining whether and what to award a participating player. The determination is usually based, in part, upon one or more game outcomes. There is usually one outcome per wager placed by the player in the game.

A game typically involves one or more variable elements that become fixed, usually by rules of the game, at a conclusion of the game when the above-described determination is made. The cards a poker player holds are examples of such game elements. The cards can be exchanged for other cards during the game. At the conclusion of the game, the cards are no longer exchangeable. The particular combination of the game elements when they are fixed, e.g., a particular combination of the cards the poker player holds at the end of a poker game, is referred to in the instant application as a game outcome, which can also be referred to as a game event or a primary game outcome. A game outcome in video poker, by way of example, is based on the combination of five cards that can be classified into defined categories, for example, Royal Flush, Straight Flush, Four of a Kind, Full House, Flush, Straight, Three of a Kind, Two Pair, High Pair (Jacks or better), Low Pair (Tens or Less), and High Card. In some versions of video poker, a game outcome of High Pair of Jacks or Better is required to earn an award. In other versions of video, a different pay model may define Three of a Kind as the lowest award-paying game outcome. The symbols on the reels of a slot machine are other examples of the variable elements. The combination of symbols that end up on a pay line of the slot machine after a pull, for example, is a game outcome.

Determining whether and what to award usually includes determining if a game outcome satisfies criteria defined by a game's pay model. The latter can be, for example, a determination of whether the cards in a hand of video poker game match a pattern required for a pay or, alternatively, a determination of whether the arrangement of symbols along a pay line of a slot game matches a pattern required for a pay.

Slot games and card games have undergone numerous increases in depth of play via the addition of bonus events and similar improvements. A bonus event involves the specification or selection of an award amount different from the main or primary game. Such a bonus award can include a variable sized award, a progressive award, and an award determined through a play mechanism much different from the main game play mechanism.

Bonus events can be triggered based upon a single game, or based upon a series of games, or a combination of the two based upon the game rules. When based upon a series of games, a mechanism known as a bonus accumulator can be used to keep track of how far the bonus advancement series has progressed.

Existing casino games trigger an immediate bonus or advance a bonus accumulator based upon a secondary game outcome. Unlike the above-described game outcome, a secondary game outcome usually involves only a portion of the variable elements of the game or sometimes even game elements that are completely separate than those used for determining the primary game outcome. By way of example, a video poker game outcome is the combination of the player's final five cards, from which the above-described determination is made in view of a game-defined categorization of poker hands. In contrast, a secondary outcome is used for the purpose of bonus triggering or bonus advancement and might involve independent or semi-dependent criteria from the primary game outcome, for example, whether a one-eyed jack was in the hand, whether two jokers were in the hand, or whether the hand only had more black cards than red cards. A bonus trigger or bonus advancement in a video poker game can also be supported by game elements not at all related to the player's cards. In the video poker variation Multi-Strike Poker, for example, a bonus event which advanced the player to the next hand even if the player loses his current hand is a random occurring event unrelated to his actual cards. Another example would be a slot machine that determines whether the entire game outcome contains patterns of symbols which match the requirements for a reward. A secondary sub-portion of such a game outcome for the purpose of bonus or bonus advancement might include whether or not a special symbol appeared anywhere, perhaps not even along a pay line.

SUMMARY

The present invention provides methods and apparatus, including computer-program products, for providing an award based upon a multiplicity of game outcomes. The invention can be implemented in many ways, for example, as a physical table game, as a video game, as a networked game, or as an Internet-based game.

The awards can be based on achieving consecutive game outcomes. Alternatively, gaming awards can be based on achieving some number of non-consecutive game outcomes, for example, a particular combination of game outcomes within a specific number of attempts. Achieving a certain number of game outcomes, either consecutively or non-consecutively, can lead to a bonus round or a progressive award.

In another implementation, bonus awards or bonus round play can be achieved through reaching a specified number of game outcomes prior to some particular event or combination of events (e.g., a player reaching a specified number of outcomes prior to the dealer reaching a different number of game outcomes, or a player reaching a specified number of game outcomes in a particular number of attempts). Alternatively, a player can compete with other players, each player vying to be the first to achieve a particular event or combination of events. The competition can also be implemented with a number of players attempting to reach a number of game outcomes prior to the dealer reaching some different specified number of game outcomes.

In general, in one aspect, the invention provides a method for providing a game. The method includes placing a bet by a player, playing of a game to produce a game outcome, evaluating a primary game outcome, paying a direct award if the primary outcome merits it, advancing a bonus accumulator if the primary outcome merits it, and if the bonus accumulator has advanced sufficiently, paying a bonus award to the player and clearing the bonus accumulator.

Implementations of the invention can include one or more of the following advantageous features. The method can include a plurality of independent bonus accumulators that are available and independently evaluated and acted upon. The method can include a plurality of dependent bonus accumulators, the awarding of any one bonus award resetting all bonus accumulators. The methods can include a plurality of players that share a same accumulator.

In general, in one aspect, the invention provides a method for providing a game. The method includes placing a bet by a player, playing of a game to produce a game outcome, advancing a bonus attempt count, evaluating a primary outcome, paying a direct award if the primary outcome merits it, advancing a bonus accumulator if the primary outcome merits it, paying the player a bonus award if the bonus accumulator has sufficiently advanced, and resetting the bonus accumulator and the bonus attempt count if the player has been awarded a bonus award, or if the bonus attempt count has been exceeded. The method can include a plurality of players that share a same bonus accumulator and bonus attempt count.

In general, in one aspect, the invention provides an electronic device for playing a betting game. The device includes a processor, a display, a data structure operable to store data corresponding to a plurality of game elements for a game, and a means for a player to make a bet and initiate a game play. The processor can generate and evaluate a primary game outcome, pay an award to the player if the primary outcome merits it, advance a bonus accumulator if primary outcome merits it, and pay a bonus award to the player and clearing the bonus accumulator.

Implementations of the invention can include one or more of the following advantageous features. The device can include a plurality of independent bonus accumulators, the plurality of independent bonus accumulators being operable to be independently evaluated and acted upon. The device can include a plurality of dependent bonus accumulators, the awarding of any one bonus resetting the plurality of dependent bonus accumulators.

In general, in one aspect, the invention provides an electronic device for playing a betting game. The device includes a processor, a display, a data structure storing data corresponding to game elements for the game, a means for a player to make a bet and initiate a game play. The processor can advance a bonus attempt count, generate and evaluate a primary game outcome, pay an award to the player if the primary outcome merits it, advance a bonus accumulator if primary outcome merits it pay a bonus award to the player and clearing the bonus accumulator and the bonus attempt count if a bonus award is paid or if the bonus attempt count has been exceeded. A plurality of players sharing a same accumulator and bonus attempt count.

In general, in one aspect, the invention provides computer program product including instructions operable to cause a programmable processor to obtain a current game outcome, retrieve another game outcome, and determine whether a player receives an award, the determining being based on the current game outcome and the other game outcome.

The invention can be implemented to realize one or more of the following advantages. A system in accordance with the invention can provide increased gaming awards based on prior game play. An increased gaming award can be a progressive award.

Further, gaming awards can be predicated on either consecutive or non-consecutive prior outcomes. Additionally, the system provides for competition between many different players for bonus awards. The system can provide for competitions, e.g., race poker, that may induce players to change their strategy in order to improve their chances of forcing one kind of outcome over another such that their payback is reduced.

The details of one or more implementations of the invention are set forth in the description below. Other features and advantages of the invention will become apparent from the description.

BRIEF DESCRIPTION OF THE FIGURES

Like reference numbers and designations in the various drawings indicate like elements.

DETAILED DESCRIPTION

Methods and apparatus described can use a number of programmed components to determine awards based on a multiplicity of game outcomes. The features described can be applied to a wide variety of computer program applications in which awards can be based on multiple game outcomes. Examples of these applications include, but are not limited to, applications for computer-implemented card games and slot games. These applications can be executed on a stand-alone device and/or a networked device.

Figure 1:
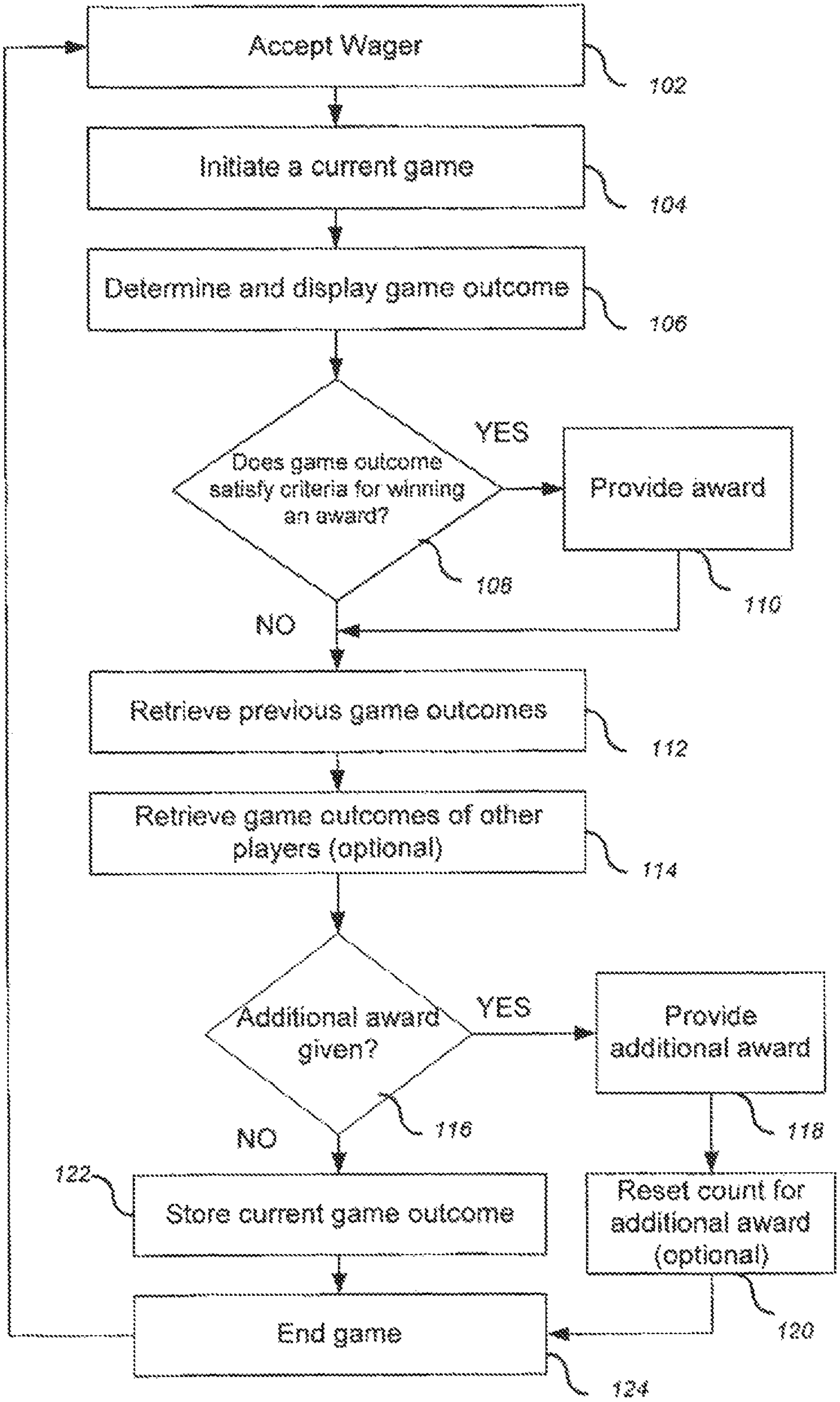
FIG. 1 shows a method 100 for providing an award based on a multiplicity of game outcomes.

FIG. 1 shows a method 100 for providing an award based on a multiplicity of game outcomes. A game device performing method 100 accepts one or more wagers from a player (step 102). More than one wager is accepted when rules of the game permit the player to place more than one wager for a game.

The device initiates a current game (step 104). The game initiated can be one selected by the player when there are multiple games provided by the device.

The device determines and displays one or more current game outcomes (step 106).

A game outcome is provided for each wager placed by the player. A game outcome can depend on one or more results of a random outcome generator. Examples of a random outcome generator include a deck of cards, a roulette wheel, dice, and a computer program driven by an engine that generates random or pseudo-random numbers.

For each game outcome, the device determines whether the game outcome satisfies a first set of criteria for winning an award (step 108). The award is usually, but not necessarily, money. The award can be, for example, a credit for playing the game. Criteria can be, for example, having a particular combination of cards or a particular combination of reel symbols on a pay line.

If at least one of the game outcomes satisfies criteria for winning an award, then the device gives the player an appropriate award (step 110). If none of the game outcomes satisfies criteria for an award, then the device retrieves previous game outcomes that the player obtained (step 112). The previous game outcomes can be stored on the device itself or, alternatively, a database accessible to the device. Optionally, the device obtains game outcomes of other players (step 114) The game outcomes of other players can be previous and/or current game outcomes. Obtaining game outcomes of other players is typically required in a game where multiple players compete for a common award, for example, race poker (described below) or where players play distinct main games but compete for a common bonus award, for example, a common progressive jackpot.

The device determines whether an additional award is to be given based on a multiplicity of game outcomes (step 116). The multiplicity of game outcomes usually includes the one or more game outcomes determined in step 106, the game outcomes retrieved in step 112, and optionally the game outcomes retrieved in step 114 The determination is made based on a set of criteria that is different from the first set of criteria. The additional award can be, for example, a bonus award that is based on criteria for giving bonus awards. If the device determines that the additional award is to be given, then the device gives the player the additional award (step 118). The additional award can be an advancement of a bonus award accumulator. Optionally, the device resets a count being maintained for the additional award (step 120), The count can be a count for a bonus award accumulator. If the device determines that no additional award is to be given to the player, then the device stores the current game outcome (step 122) and ends the game (step 124).

FIGS. 2-8 are screen shots of an example of computer-implemented game that provides an award based on a multiplicity of game outcomes. The outcome of the game (i.e., the game outcome) is a set of three matching symbols revealed by the player. (At the start of the game all symbols are hidden. The player reveals a hidden symbol by selecting the symbol.) The player reveals symbols until there are three matching symbols. If the three matching symbols form a combination for which there is an award, the player is given the award. The award is indicated by the number of the matching symbols. If the three matching symbols are the chimp symbols or the ape symbols, this is normally a losing game outcome. However, such a game outcome has the secondary effect of changing the player's bonus standing. In this game, there is a bonus accumulator, depicted as spots along the palm tree in the left of the game screen. If the player collects five or more of the same losing game outcomes, either five or more chimp game outcomes (a chimp game outcome is one that includes three chimp symbols) or five or more ape game outcomes (an ape game outcome is one that includes three ape symbols), the player is eligible for a bonus award. The rules of the game require that the five losing outcomes all be of the same type, for example, all chimps, with none of the other losing type occurring. Winning game outcomes do not affect the bonus standing.

Figure 2:
FIGS. 2-9 are screen shots of a series of games for which there is an award based on a multiplicity of game outcomes.
Figure 3:
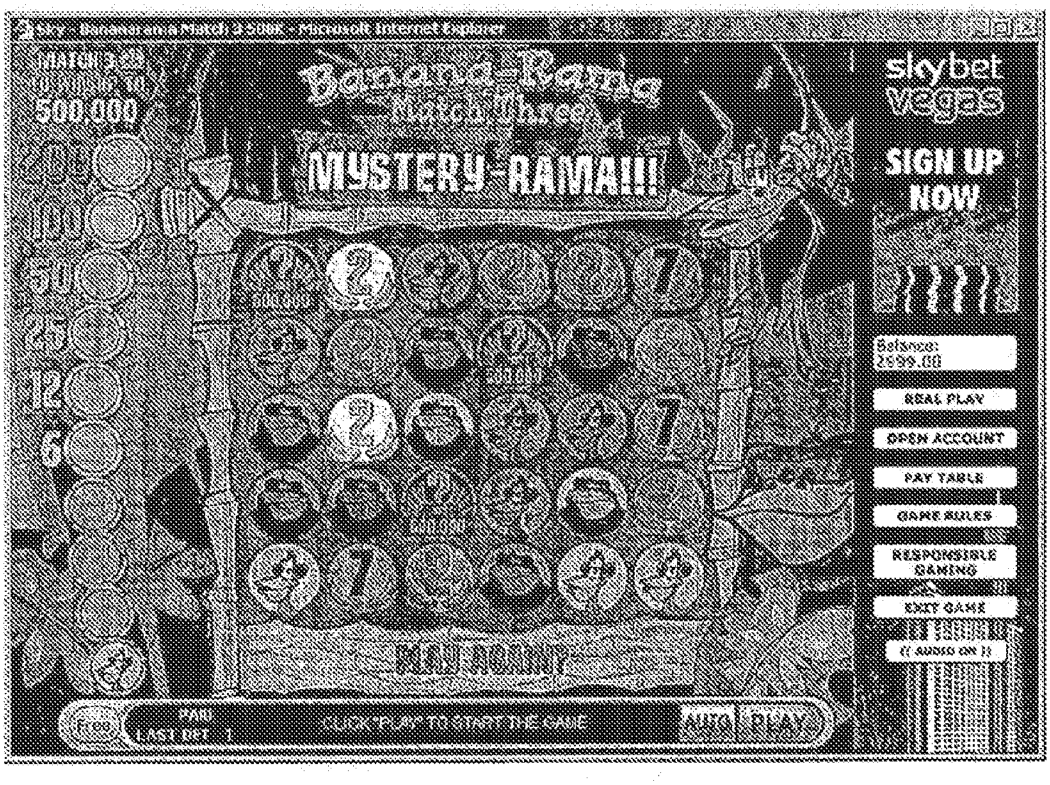

FIG. 2 shows a screen shot a game where the bonus accumulator is empty. FIG. 3 shows a screen shot of a subsequent game where the player matches three chimp symbols, which is a non-paying game outcome. However, this game outcome does lead to a chimp symbol being added to the accumulator.

Figure 4:
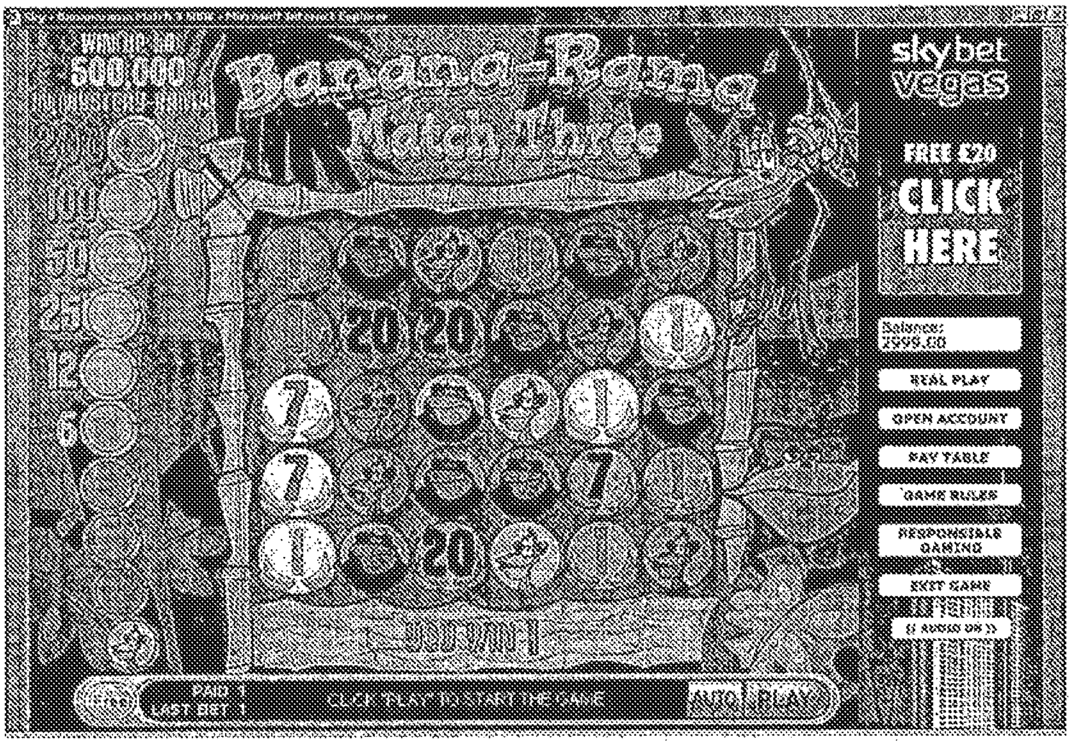

FIG. 4 shows a screen shot of a subsequent game in which the player matches three "1" symbols leading to a payout of, 1 credit. A winning outcome, in this game, does not affect the bonus accumulator for the player. The single chimp from the game of FIG. 3 remains in the bonus accumulator. Only losing game outcomes affect the bonus accumulator.

Figure 5:
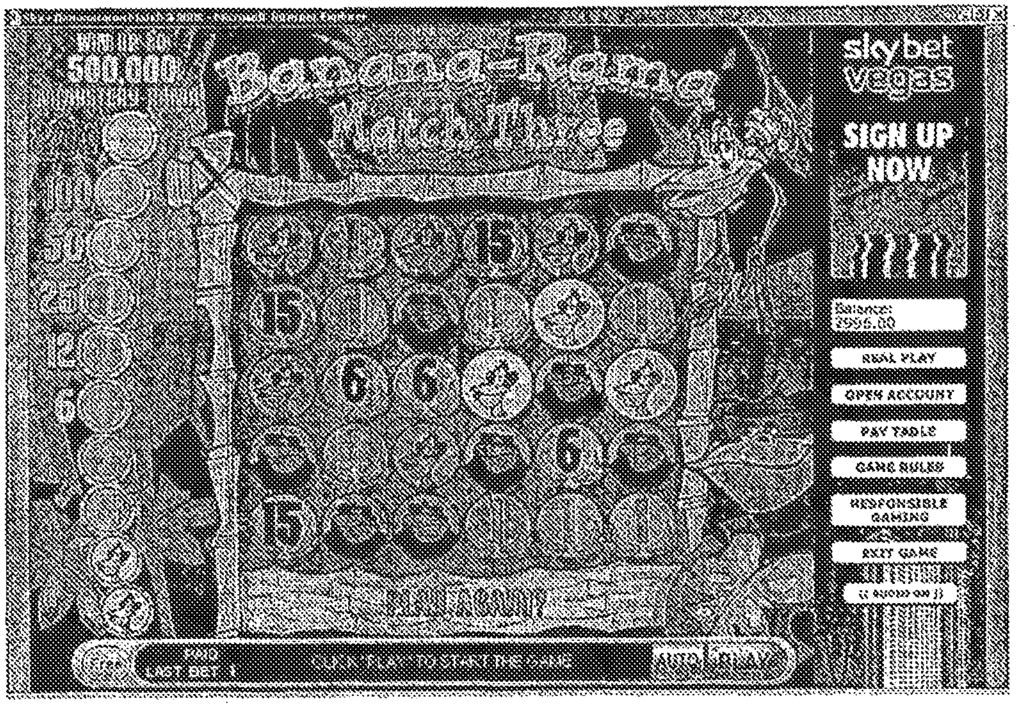

FIG. 5 shows a screen shot of a subsequent game in which the player matches another three chimp symbols. Because there is already a chimp in the bonus accumulator, another chimp is added to the accumulator. The player now needs only three more chimp outcomes, without any intervening ape outcomes, to qualify for a bonus.

Figure 6:

FIG. 6 shows a screen shot of a subsequent game in which the player matches three ape symbols. The game outcome here causes the two chimps in the accumulator shown in FIG. 5 to be replaced by a single ape.

Figure 7:
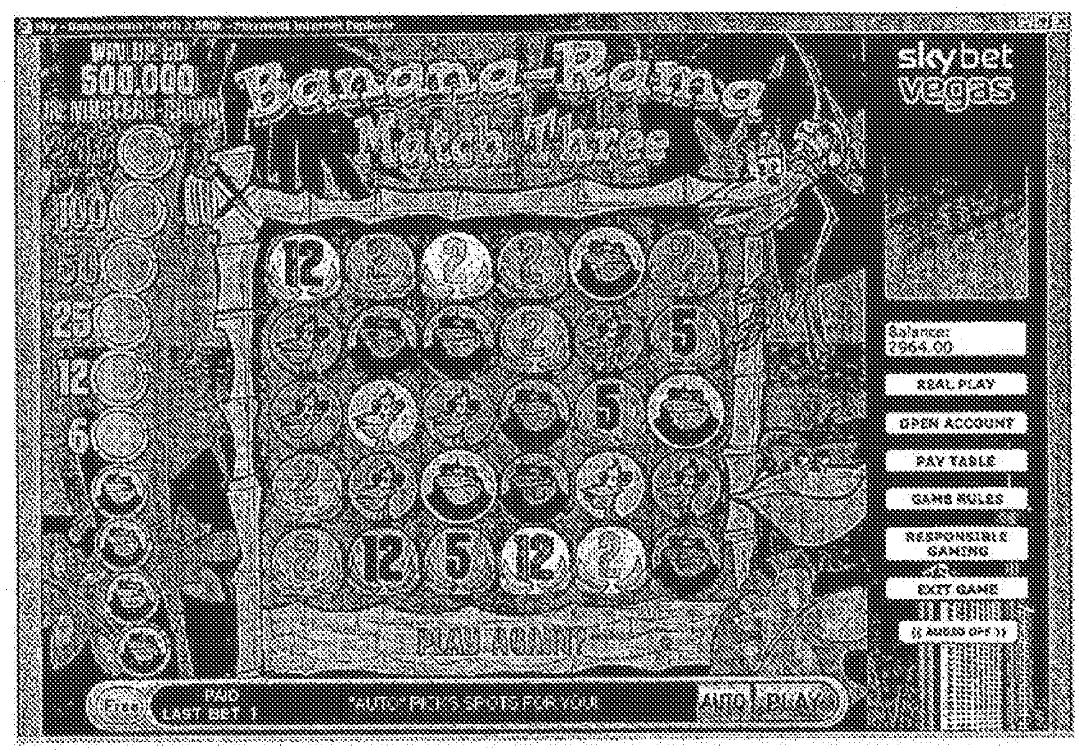

FIG. 7 shows a screen shot of a subsequent in which the player has had four losing ape outcome without an intervening losing chimp outcome. There are thus four ape symbols in the accumulator.

Figure 8:

FIG. 8 shows a screen shot of a subsequent game in which the player matches another three ape symbols, making this game outcome his fifth-in-a-row losing ape outcome without an intervening losing chimp outcome. The player has now earned a bonus opportunity. In this example game, the games rules are defined to allow the player to collect his bonus award or to risk it try for a higher award. A different game can be defined where the player is simply awarded a bonus award for each level he attains with no decision or risk involved.

Figure 9:
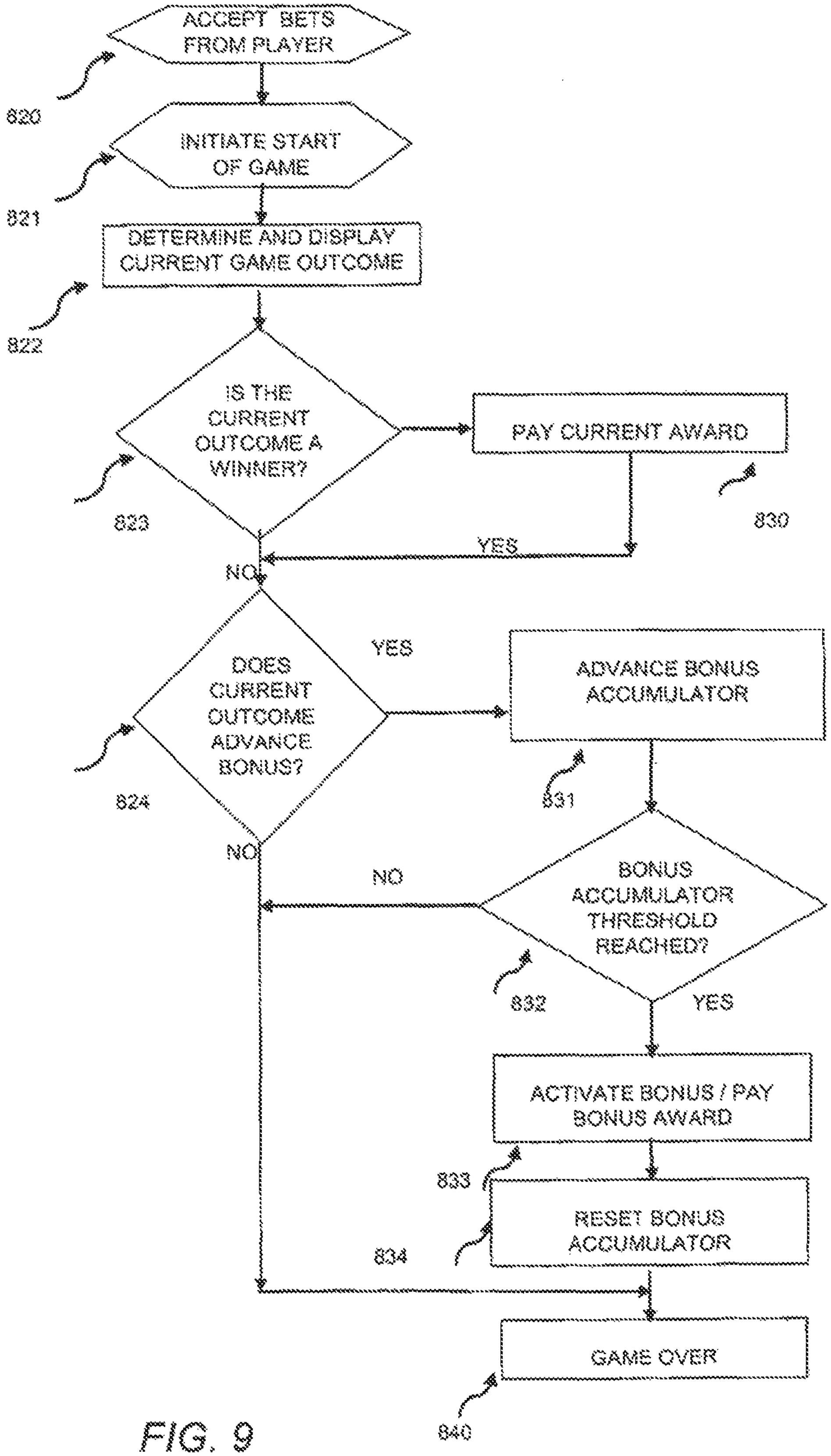

FIG. 9 shows a method for executing the above-described game. A device executing the game receives a wager from the player (step 820) and initiates a current game (step 821). An outcome for the current game, i.e., a current game outcome, is generated and displayed (step 822). The device determines whether the current game outcome is a direct winner (step 823). If the current game outcome is a direct winner, the player is paid accordingly (step 830). If the current game outcome is not a direct winner, the device determines whether the current game outcome advances the bonus status (step 824). If device determines that the current game outcome does not advance the bonus status, then the current game is over (step 840). If device determines that the current game outcome advances the bonus status, the bonus status is updated accordingly (step 831). The device determines whether the advancement causes the bonus status to advance sufficiently, for example, reach a threshold (step 832). If the advancement does cause the status to advance sufficiently, a bonus event occurs leading to a bonus award being paid (step 833) and the bonus status is reset (step 834). If the advancement was insufficient, then the game is over (step 840).

Figure 10:
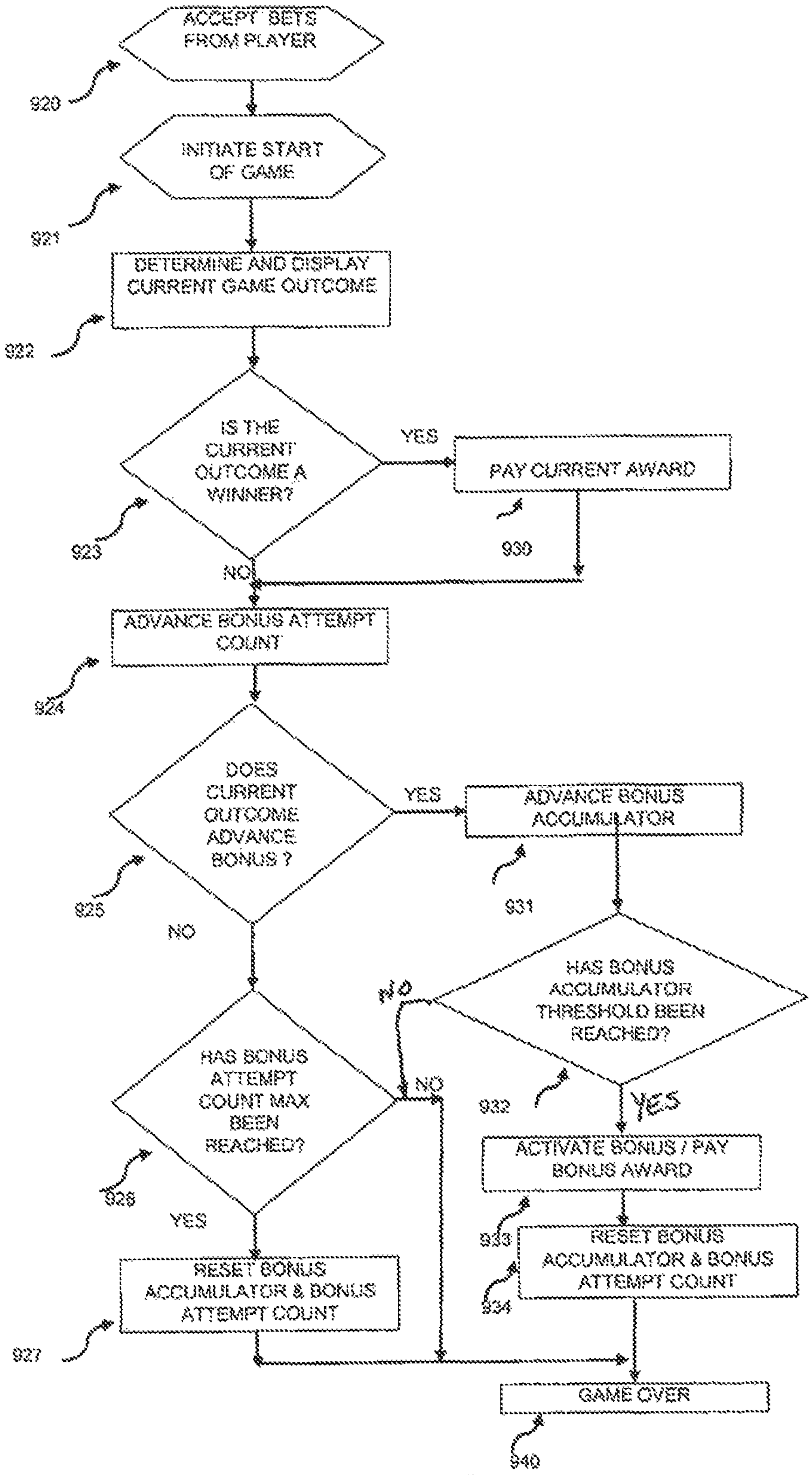
FIG. 10 is a method for executing a game having an award based on a multiplicity of game outcomes.

FIG. 10 shows a method for executing an alternative of the above-described game. In this alternative, the player is only allotted a certain number of tries to attain the bonus. For every game, the bonus attempt count is updated. The device executing the game receives a wager from the player (step 920) and initiates a current game (step 921). An outcome for the current game, i.e., a current game outcome, is generated and displayed (step 922). The device determines whether the current game outcome is a direct winner (step 923), If the current game outcome is a direct winner, the player is paid accordingly (step 930). Otherwise, the player is not. paid. The bonus attempt count is updated (step 924).

The device determines whether the game outcome advances the bonus status (step 925). If the device determines that the game outcome advances the bonus accumulator, then the device advances the bonus accumulator (step 931) and determines whether a bonus award threshold has been reached (step 932). If yes, then the device activates and pays the player the bonus award (step 933) and rests the bonus accumulator and bonus attempt count (step 934). If the bonus award has not been reached, then the device ends the game.

If the device determines that the game outcome does not advance the bonus status (NO branch of step 925), then the device determines whether a maximum has been reached for the bonus attempt count (step 926). If yes, the device resets the bonus accumulator (step 927). If no, the device ends the game without resetting the bonus accumulator.

Figure 11:
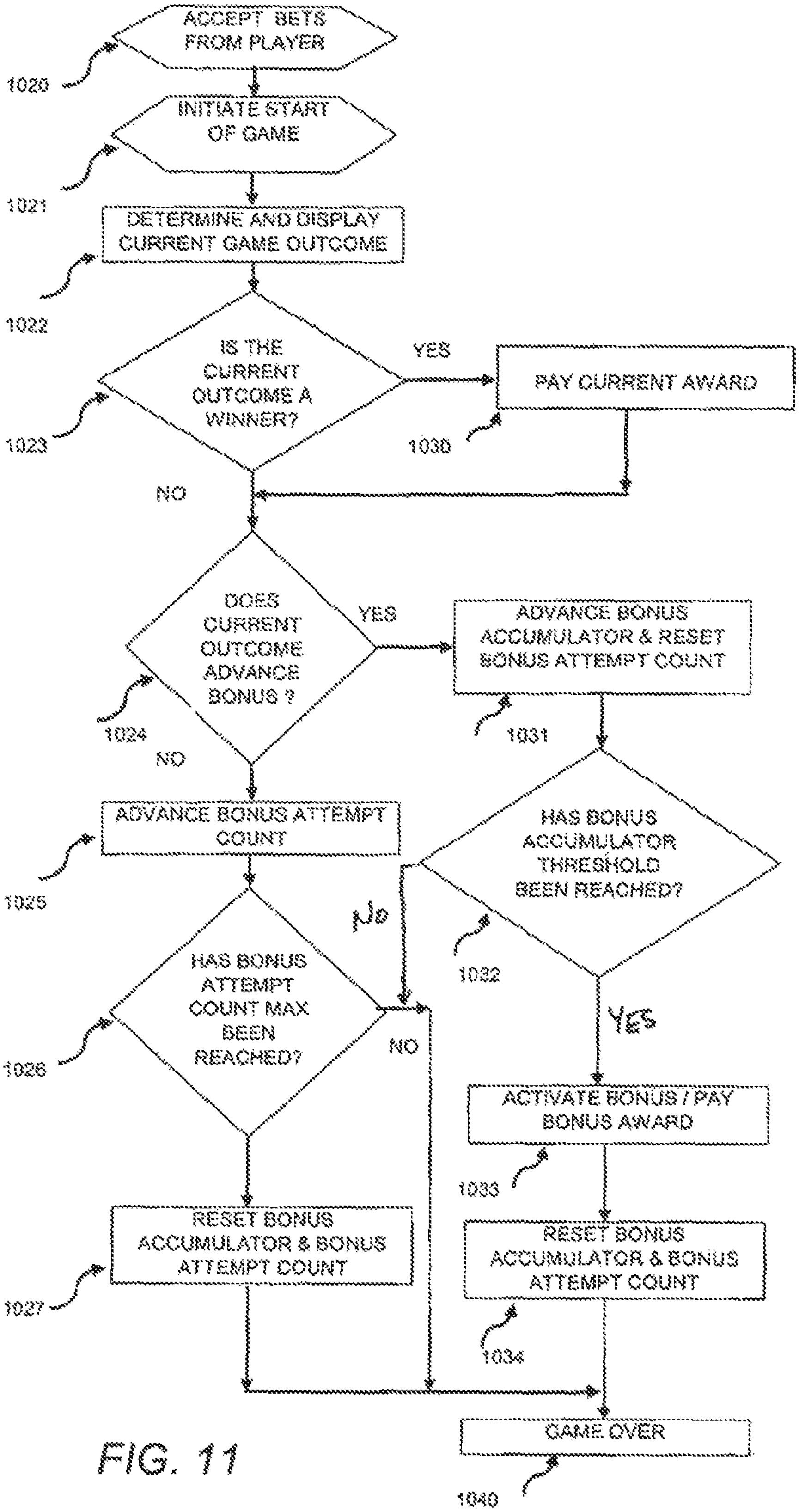
FIG. 11 is a method for executing an alternative of the game.

FIG. 11 shows a method for executing another alternative of the above-described game. The alternative is similar to the process of FIG. 10. Instead of having to achieve the bonus within a certain number of tries, however, the player in this game merely has to advance the bonus within a certain number of tries.

Figure 12:
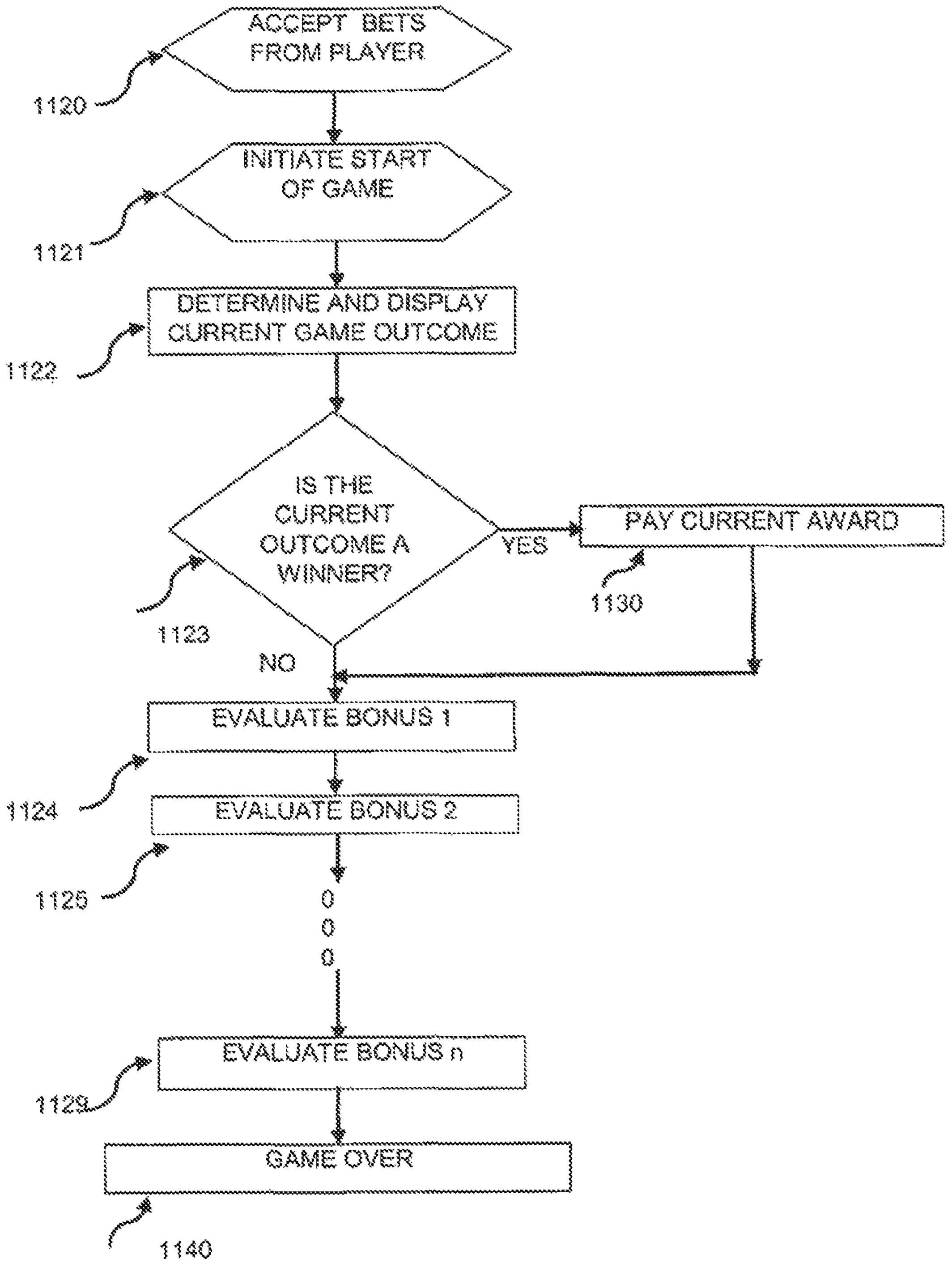
FIG. 12 is a method for executing an alternative of the game.

The methods described in FIGS. 9-11 can also apply to games that have a plurality of independent bonuses. For example, FIG. 12 shows a method for executing an alternative that has two or more bonuses. After the main game outcome is evaluated in step 1122 and any main game award is paid in step 1130, the device independently evaluates the bonuses. Steps 1124-1129 each evaluate one of the one or more bonuses. Evaluation of the bonuses can be performed as described above.

Figure 13:
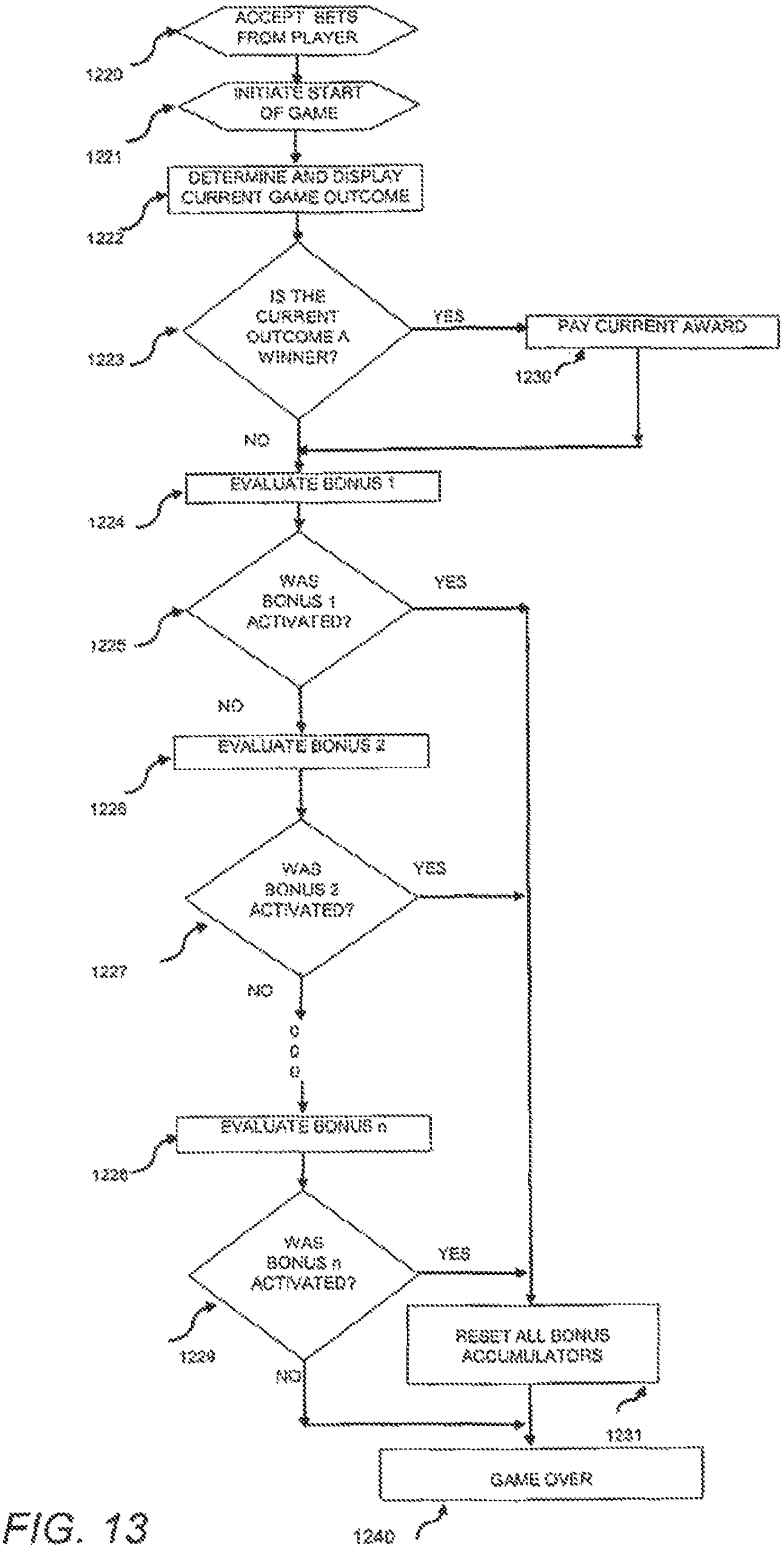
FIG. 13 is a method for executing an alternative of the game.

FIG. 13 shows a method for executing an alternative of the above-described game where there is a plurality of interdependent bonus accumulators. If one accumulator reaches a threshold, which causes a bonus event to be activated, then all bonus accumulators are reset. Each bonus evaluation includes a step (e.g., steps 1225, 1227, and 1229) in which the device determines if a bonus award has been activated. If there has been a bonus award activated, then all bonus accumulators are reset (step 1231) and the game ends (1240).

The above described methods can also apply to networked games where a plurality of players shares the same bonus accumulator and, when appropriate, they may share the same bonus try counter.

The following paragraphs describe other games that provide an award based on a multiplicity of game outcomes. In one or more of the following implementations, methods and apparatus are designed to provide for a viable casino game. Viability can require, for example, that the overall payback not exceed one hundred percent, the payback being the overall amount returned to players. Viability can also require, for example, that: the overall payback must comply with regulatory requirements of the jurisdiction in which the game is offered; the overall payback is acceptable in view of the marketplace (e.g., 88% to 96% for an initial target market); the game provides sufficient hit frequency, i.e., the rate of awards given to a player (e.g., every 2 to 5 minutes of play for small awards of 2x to 20x, or every 5 to 10 minutes for large awards of 15x to 50x, where x is the denomination); and the game provides sufficiently high awards to attract players, for example, awards of 50x to 100x.

One aspect of the invention can be implemented in the context of network casino gaming. For example, in a networked video poker game where the person who gets the 10th 3 of a kind outcome across all players wins a bonus.

In one implementation, a bonus game or round can be initiated upon achieving n consecutive winning outcomes instead of, or in addition to, the bonus award. Another implementation provides bonus awards or bonus round activation when a player achieves n outcomes in n+k tries, where k is some number greater than or equal to zero. For example, a player can receive a bonus award or round if seven of the previous ten plays produced eligible outcomes. In this implementation, the n outcomes need not be consecutive. Eligible outcomes can be winning outcomes or based on some other criteria.

One implementation bases an award or bonus round activation upon attaining n outcomes prior to some particular event occurring. In this implementation, the n outcomes do not need to be consecutive. For example, in the Blackjack context, a bonus award or round can be earned if a player achieves n Blackjack hands before the dealer gets one Blackjack. In another example, a bonus award or round can be earned when the player achieves three hands totaling twenty-one before the dealer gets two Blackjacks. In another example, multiple pays can be included such that getting three totals of twenty-one prior to the dealer getting two Blackjacks, as in the previous example, results in a certain bonus award or round but each additional total of twenty-one attained prior to the dealer getting a Blackjack results in an additional bonus award or round.

Another implementation of the invention allows for k independent awards that a player is vying for, x1, x2, . . . xk, based on whether the player achieves n1, n2, . . . nk outcomes o1, o2, . . . ok. For example, in a video poker game there are several different possible hands or outcomes, each having a different relative value based on the probability of achieving that hand. In this implementation, each hand or outcome will have a certain associated n value representing the number of times that outcome must be achieved in order to win the award associated with that outcome. The n value must be reached before the n value associated with the other outcomes. Whichever n value is reached for a particular outcome first, the bonus award or round associated with that outcome is attained.

For example, if the n value of the outcome of two pairs is 50, a player must get two pairs 50 times before achieving the required n level for any of the other entries to win the bonus award or round associated with two pairs. (The count represents the number of times a player has received a particular outcome.) In one implementation, reaching the award level for one outcome resets the count in all outcome events to zero such that bonus opportunities start anew for each outcome event. Alternatively, only the count for the achieved event is reset to zero and the counts for each other outcome event remain as they were prior to the achieved count. For example, if upon reaching 50 two-pair outcomes a player also has twenty three-of-a-kind outcomes, the award is given for the 50 two-pair outcomes, the count for the two-pair outcomes is reset, and the count for the three-of-a-kind outcomes stays at twenty. The player can, thus, continue advancing the three-of-a-kind count towards its n value, which can be, for example, thirty.

In one implementation, independent counts can be maintained towards different outcomes as in the previous example, except that the outcomes can overlap. For example, a Full House would also be counted as a Three-of-a-kind, and if the pair in the Full House were Jacks or Better, then Jacks or Better would also be credited as another outcome. Thus, the count in each outcome of Full House, Three-of-a-kind, and Jacks or Better would increase by one.

Where gaming is implemented over a network, players can compete against each other to reach n outcomes in order to attain a bonus award or bonus round play. For example, in the implernentation where a player gets a bonus award or round for reaching n outcomes before the dealer attains a particular event or combination of events, there can be competition between other players to reach n first. If twenty players are in a pool playing Blackjack there can be some n number of Blackjacks that a player must attain prior to the dealer getting some number y of Blackjacks. The players compete against each other to be the first to reach n and, thus, win a bonus award or round before the dealer reaches y Blackjacks. For a further example, the compete feature can also be implemented in the case of independent awards. If twenty players are within a pool playing video poker, there is an n value for outcomes such as a Full House. The twenty players in the pool compete to reach the n value for any outcome prior to the other players.

In one implementation, games provide variable outcome bonuses. A player is allowed to purchase a chance to win one or more bonus awards. That is, the player is allowed to purchase bonus award opportunities. For example, where wagering one to five coins provides a player with normal play, wagering a sixth coin provides play with one or more bonus award opportunities. Alternatively, opportunities for bonus awards can be provided if a maximum wager amount is placed (e.g., five coins wagered in the above described five coin game) or as a result of a normal wager (e.g., one to five coins wagered in the above described five coin game). Buy-a-pay match poker, accumulated win poker, and multi-strike poker are examples of games that provide variable outcome bonuses. The games mentioned above and their variations are described below.

Buy-a-pay match poker provides additional bonus award opportunities when an additional coin is wagered. For example, where wagering one to five coins provides a player with normal play, a sixth coin wagered provides play with, for example, a bonus multiplier for a winning outcome (two pairs, three of a kind, a flush, and so forth).

Accumulated win poker counts the number of time a player achieves a particular winning outcome and provides a bonus award when the count (i.e., the bonus accumulator) reaches a certain threshold number. Accumulated win poker can include bonus accumulators for multiple and different winning outcomes. For example, a bonus accumulator can be provided for each of a flush outcome and a two pair outcome. The bonus award can be given when one or any combination of bonus accumulators reach their respective threshold count (i.e., the accumulators are filled). The bonus award can be a fixed payout amount, a random payout amount, a payout amount that is based on the outcome, a multiplier of a non-bonus award, a bonus round, advancement to a bonus round, an increase in an accumulated awards such as a jackpot, and any combination of the examples of bonus awards described. For the disposition of the game after a bonus award is given, all bonus accumulators is reset after any bonus awards given. Alternatively, the game can reset only the bonus accumulator that has been filled and maintain the count in the other bonus accumulators The game can provide an indication of the progress of a bonus accumulator by, for example, displaying a count next to the winning outcome. The bonus opportunities can be provided when a maximum wager is placed. Alternatively, the bonus opportunities can be provided when a wager amount above the maximum amount for normal play is placed.

In multi-strike star poker, if a player achieves a particular outcome better than or equal to a threshold outcome (e.g., flush or better), then the particular outcome is assigned a certain number of stars. Every time another winning outcome occurs, one of the stars is taken away. If the player hits the particular outcome again before all the stars are taken away, then the player is given a bonus award. Alternatively, 2x symbols can be displayed instead of stars. Should the particular winning outcome re-occurs before all of the 2x symbols are taken away, the player receives an award multiplier that is the product (or alternatively the sum) of the remaining 2x symbols.

For the above described games that provide variable outcome bonuses, a bonus award can be a fixed payout amount, a random payout amount, a payout amount that is based on the outcome, a multiplier of a non-bonus award, a bonus round, advancement to a bonus round, an increase in an accumulated awards such as a jackpot, and any combination of the examples of bonus awards described. Furthermore, the size or type of bonus award can vary based on the winning outcome. For example, the bonus award for a royal flush can be greater than the bonus award for a three of a kind. The bonus award can vary from wager to wager (i.e., from proposition to proposition). The bonus award can be based on previous outcomes.

The invention can be implemented as a traditional table game, or in digital electronic circuitry, or in computer hardware, firmware, software, or in combinations of them. Apparatus of the invention can be implemented in a computer program product tangibly embodied in a machine-readable storage device for execution by a programmable processor; and method steps in the invention can be performed by a programmable processor execution a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and optical disks. Any of the foregoing can be supplemented by, or incorporated in, ASICs (application-specific integrated circuits).

To provide for interaction with a user, the invention can be implemented on a computer system having a display device such as a monitor or LCD screen for displaying information tot eh user and a keyboard and a pointing device such as a mouse or trackball by which the user can provide input to the computer system. The computer system can be programmed to provide a graphical user interface though which computer programs interact with users.

The computing system can include clients and servers. A client and server are generally remote from each other and typically interact through a communication network. The relationship of client and server arises by virtue of computer programs running on the respective computers and having a client-server relationship to each other. This can, for example, include an Internet-based implementation.

A number of implementations of the invention have been described. Nevertheless, it will be understood that various modifications may be made without departing from the spirit and scope of the invention. For example, the steps for the methods can be performed in a different order. The criteria for main game awards and bonus awards can be defined in a same pay model or in separate pay models.

The invention claimed is:

1. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) enable a player to place a bonus opportunity wager associated with a quantity of at least two plays of a wagering game, and (b) if the player placed the bonus opportunity wager:

(i) for one of the plays of the wagering game of the quantity of plays of the wagering game:

(A) enable the player to place a game wager, (B) generate a game outcome from a plurality of game outcomes, (C) display the generated game outcome to the player, and (D) provide to the player any game award associated with the generated game outcome, (ii) if any of the generated game outcomes is a winning game outcome associated with a game award having a value greater than a threshold value, reset the bonus opportunity counter, wherein said threshold value is greater than zero, and (iii) if each of the generated game outcomes are associated with one of: a losing game outcome associated with a game award having a value of zero and any of a plurality of winning game outcomes associated with any of a plurality of game awards each having a value greater than zero and less than the threshold value:

(A) modify the bonus opportunity counter, (B) display to the player the modified bonus opportunity counter, (C) if the modified bonus opportunity counter reaches a designated value, provide a bonus opportunity award to the player, and (D) if the modified bonus opportunity counter has not reached the designated value and has not been reset in association with any of the plays of the wagering game of the quantity of plays of the wagering game, repeat (i) to (iii) for another one of the plays of the wagering game of the quantity of plays of the wagering game.

2. The gaming system of claim 1, wherein the bonus opportunity award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

3. A gaming system comprising:

at least one input device;

at least one display device;

at least one processor; and at least one memory device which stores a plurality of instructions, which when executed by the at least one processor, cause the at least one processor to operate with the at least one display device and the at least one input device to:

(a) enable a player to place a bonus opportunity wager associated with a quantity of at least two plays of a wagering game, and (b) if the player placed the bonus opportunity wager:

(i) for each of the quantity of plays of the wagering game:

(A) enable the player to place a game wager, (B) generate a game outcome from a plurality of game outcomes, (C) display to the player the generated game outcome, and (D) provide to the player any game award associated with the generated game outcome, (ii) if each of the generated game outcomes of the quantity of plays of the wagering game are one of: a losing game outcome associated with a game award having a value of zero and any of a plurality of winning game outcomes associated with any of a plurality of game awards having a value greater than zero and less than a threshold value greater than zero, provide the player a bonus opportunity award, and (iii) if any of the generated game outcomes of the quantity of plays of the wagering game is a winning game outcome associated with a game award having a value greater than the threshold value, not provide the player the bonus opportunity award.

4. The gaming system of claim 3, wherein the bonus opportunity award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

5. A method of operating a gaming system, said method comprising:

(a) enabling a player to place a bonus opportunity wager associated with a quantity of at least two plays of a wagering game, and (b) if the player placed the bonus opportunity wager:

(i) for one of the plays of the wagering game of the quantity of plays of the wagering game:

(A) enabling the player to place a game wager, (B) causing at least one processor to execute a plurality of instructions to generate a game outcome from a plurality of game outcomes, (C) causing at least one display device to display the generated game outcome to the player, and (D) providing to the player any game award associated with the generated game outcome, (ii) if any of the generated game outcomes is a winning game outcome associated with a game award having a value greater than a threshold value, causing the at least one processor to execute the plurality of instructions to reset the bonus opportunity counter, wherein said threshold value is greater than zero, and (iii) if each of the generated game outcomes are associated with one of: a losing game outcome associated with a game award having a value of zero and any of a plurality of winning game outcomes associated with any of a plurality of game awards each having a value greater than zero and less than the threshold value:

(A) causing the at least one processor to execute the plurality of instructions to modify the bonus opportunity counter, (B) causing the at least one display device to display to the player the modified bonus opportunity counter, (C) if the modified bonus opportunity counter reaches a designated value, providing a bonus opportunity award to the player, and (D) if the modified bonus opportunity counter has not reached the designated value and has not been reset in association with any of the plays of the wagering game of the quantity of plays of the wagering game, repeating (i) to (iii) for another one of the plays of the wagering game of the quantity of plays of the wagering game.

6. The method of claim 5, wherein the bonus opportunity award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

7. The method of claim 5, which is provided through a data network.

8. The method of claim 7, wherein the data network is an Internet.

9. A method of operating a gaming system, said method comprising:

(a) enabling a player to place a bonus opportunity wager associated with a quantity of at least two plays of a wagering game, and (b) if the player placed the bonus opportunity wager:

(i) for each of the quantity of plays of the wagering game:

(A) enabling the player to place a game wager, (B) causing at least one processor to execute a plurality of instructions to generate a game outcome from a plurality of game outcomes, (C) causing at least one display device to display to the player the generated game outcome, and (D) providing to the player any game award associated with the generated game outcome, (ii) if each of the generated game outcomes of the quantity of plays of the wagering game are one of: a losing game outcome associated with a game award having a value of zero and any of a plurality of winning game outcomes associated with any of a plurality of game awards having a value greater than zero and less than a threshold value greater than zero, providing the player a bonus opportunity award, and (iii) if any of the generated game outcomes of the quantity of plays of the wagering game is a winning game outcome associated with a game award having a value greater than the threshold value, not providing the player the bonus opportunity award.

10. The method of claim 9, wherein the bonus opportunity award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

11. The method of claim 9, which is provided through a data network.

12. The method of claim 11, wherein the data network is an Internet.

13. A non-transitory computer readable medium including a plurality of instructions, which when executed by at least one processor, cause the at least one processor to:

(a) enable a player to place a bonus opportunity wager associated with a quantity of at least two plays of a wagering game, and (b) if the player placed the bonus opportunity wager:

(i) for one of the plays of the wagering game of the quantity of plays of the wagering game:

(A) enable the player to place a game wager, (B) generate a game outcome from a plurality of game outcomes, (C) cause at least one display device to display the generated game outcome to the player, and (D) provide to the player any game award associated with the generated game outcome, (ii) if any of the generated game outcomes is a winning game outcome associated with a game award having a value greater than a threshold value, reset the bonus opportunity counter, wherein said threshold value is greater than zero, and (iii) if each of the generated game outcomes are associated with one of: a losing game outcome associated with a game award having a value of zero and any of a plurality of winning game outcomes associated with any of a plurality of game awards each having a value greater than zero and less than the threshold value:

(A) modify the bonus opportunity counter, (B) cause the at least one display device to display to the player the modified bonus opportunity counter, (C) if the modified bonus opportunity counter reaches a designated value, provide a bonus opportunity award to the player, and (D) if the modified bonus opportunity counter has not reached the designated value and has not been reset in association with any of the plays of the wagering game of the quantity of plays of the wagering game, repeat (i) to (iii) for another one of the plays of the wagering game of the quantity of plays of the wagering game.

14. The non-transitory computer readable medium of claim 13, wherein the bonus opportunity award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

15. A non-transitory computer readable medium including a plurality of instructions, which when executed by at least one processor, cause the at least one processor to:

(a) enable a player to place a bonus opportunity wager associated with a quantity of at least two plays of a wagering game, and (b) if the player placed the bonus opportunity wager:

(i) for each of the quantity of plays of the wagering game:

(A) enable the player to place a game wager, (B) generate a game outcome from a plurality of game outcomes, (C) cause at least one display device to display to the player the generated game outcome, and (D) provide to the player any game award associated with the generated game outcome, (ii) if each of the generated game outcomes of the quantity of plays of the wagering game are one of: a losing game outcome associated with a game award having a value of zero and any of a plurality of winning game outcomes associated with any of a plurality of game awards having a value greater than zero and less than a threshold value greater than zero, provide the player a bonus opportunity award, and (iii) if any of the generated game outcomes of the quantity of plays of the wagering game is a winning game outcome associated with a game award having a value greater than the threshold value, not provide the player the bonus opportunity award.

16. The non-transitory computer readable medium of claim 15, wherein the bonus opportunity award is at least one selected from the group consisting of: a static award amount, a random award amount, an award amount that is based on at least one of the generated game outcomes, a multiplier of a non-bonus award, a bonus round, an advancement to the bonus round, and an increase in a progressive award.

* * * * *

UNITED STATES PATENT AND TRADEMARK OFFICE
CERTIFICATE OF CORRECTION

PATENT NO. : 8,641,509 B2
APPLICATION NO. : 13/800949
DATED : February 4, 2014
INVENTOR(S) : Mark C. Nicely et al.

It is certified that error appears in the above-identified patent and that said Letters Patent is hereby corrected as shown below:

IN THE CLAIMS

In Claim 8, Column 13, Line 21, replace “Internet” with --internet--.
In Claim 12, Column 13, Line 61, replace “Internet” with --internet--.

Signed and Sealed this
Third Day of November, 2015

Michelle K. Lee
*Director of the United States Patent and Trademark Office*